Dec. 6, 1938.    H. F. VICKERS    2,139,050
VISCOSITY COMPENSATING DEVICE
Filed May 1, 1937    2 Sheets-Sheet 2
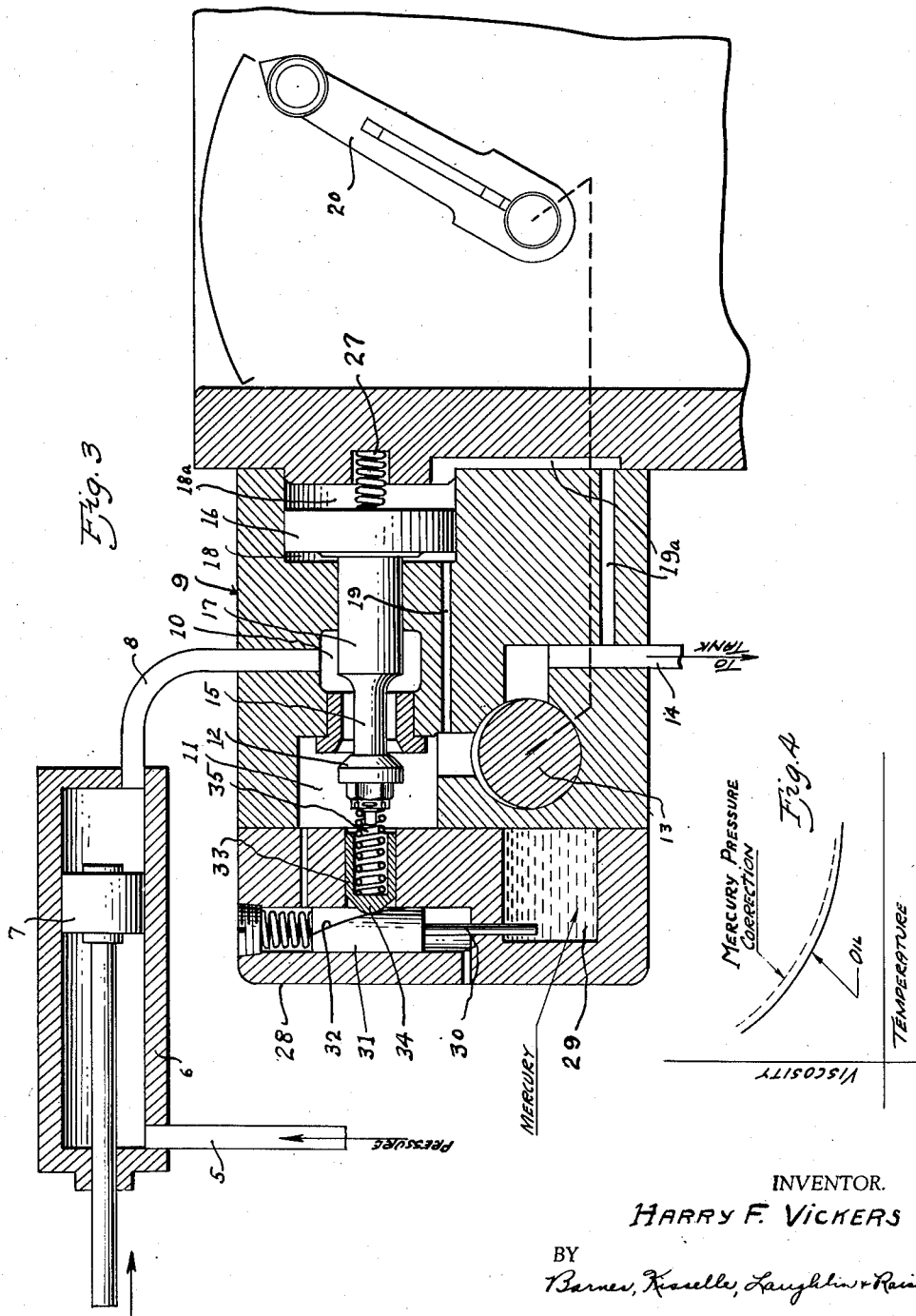
INVENTOR.
HARRY F. VICKERS
BY
Barnes, Kisselle, Laughlin & Raisch
ATTORNEYS Patented Dec. 6, 1938

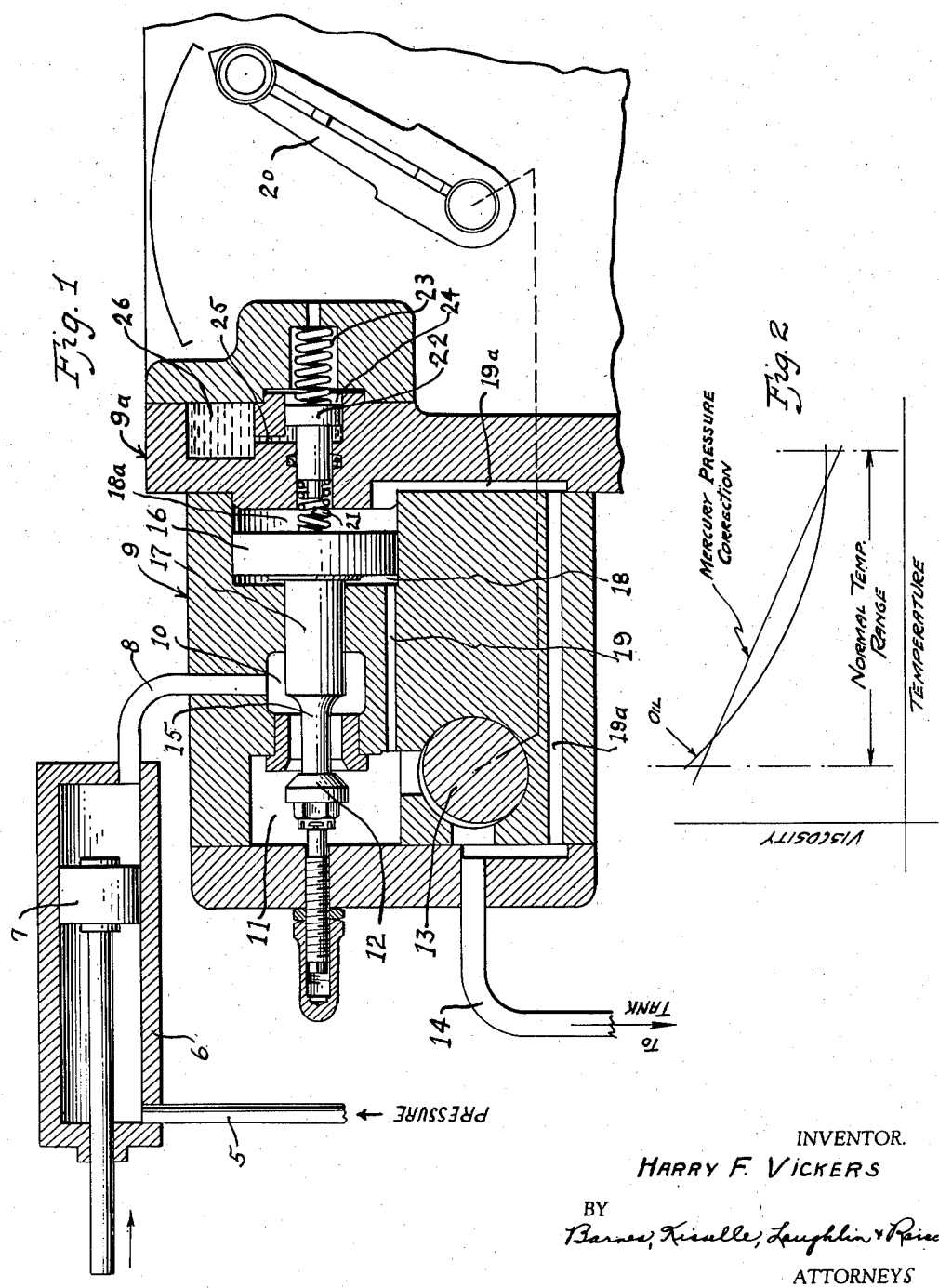

2,139,050

UNITED STATES PATENT OFFICE 2,139,050

VISCOSITY COMPENSATING DEVICE

Harry F. Vickers, Detroit, Mich.

Application May 1, 1937, Serial No. 140,073

9 Claims. (Cl. 137—152.5)

This invention relates to a viscosity compensating device and has particularly to do with a flow control valve which is provided with a means to compensate for change in viscosity of the oil or pressure fluid in a pressure work system.

It is well known that in the use of machine tools, the rate of movement of the table member, or the feed member bearing the cutting tool, must, as a rule, be very constant. In adapting hydraulically actuated devices to machine shop use, the greatest problem has been to achieve accurate and constant feed rates under varying conditions of load. One of the contributing factors to inaccuracy has been the change in the viscosity of the liquid used in the hydraulic system, due to changes in temperature. Various speed control valves have been devised to control the flow of pressure liquid to or from the liquid actuated devices, but none of them have attempted to provide compensating means for changes in viscosity of the pressure liquid.

The present invention contemplates the use of a compensating means on a flow or speed control means similar to that disclosed in my copending application Serial No. 543,908, said compensating means being arranged to automatically adjust the flow control mens for changes in viscosity of pressure oil due to changes in temperature.

My speed or flow control device has an orifice regulatable to control the flow of liquid therethrough, and is especially adapted to regulate the speed of a liquid-actuated element hydraulically connected to said flow control means. The device embodies a hydrostatic pressure regulating valve, preferably in combination as a simple unit with a variable orifice, said hydrostatically operated valve being so arranged and proportioned that neither a change in pressure due to a change in load, nor a change in viscosity due to a temperature change of the liquid will increase or decrease the flow across the orifice and thereby maintain constant the speed of the liquid actuated element.

As contemplated by the present invention the movement of this hydrostatic pressure regulating valve, which normally maintains a constant pressure differential across the outlet orifice, is to be partially controlled by a spring, the tension of which will be varied directly, with the temperature of the oil in the system. The device is so arranged that an increase or decrease in the viscosity of the oil due to temperature changes, which changes the flowing properties of the oil, will be compensated for by a reduction in the opening pressure of the hydrostatic valve.

The invention is especially adapted for use in a hydraulic system containing either a constant or a variable volume pump. In practice, in systems using variable pumps fairly good results are often obtained when the work is first set up, but when the oil warms up and thins, and as the tools become dull, there is a noticeable slowing up due to a change in the slippage in the variable pump.

In the drawings:

Fig. 1 shows a modification of the invention as embodied in a flow control valve and used with a cylinder motor.

Fig. 2 is a plotting of the mercury correction curve of the modification shown in Fig. 1 with the viscosity curve of the oil.

Fig. 3 is similar to Fig. 1 showing a modified structure for the compensating means.

Fig. 4 is a plotting of the correction curve of the modification shown in Fig. 3.

Referring to Fig. 1 a pressure conduit 5 leads to one end of a cylinder motor 6 in which operates a piston 7. From the other end of the cylinder motor 6 is a conduit 8 leading to a housing of the flow control valve generally designated 9. The housing 9 is provided with a chamber 10 in communication with the incoming liquid conduit 8, and a chamber 11 for connecting a balanced inlet valve 12 and a variable orifice outlet or throttle valve 13. This outlet valve 13 controls the volume of liquid passing into an outlet 14.

The balanced valve 12 is connected by means of a stem 15 to a piston 16. The diameter of the stem at a point 17 being predetermined relative to the effective diameter of the valve 12 at its valve seat. The chamber 11 is in direct communication with a chamber 18 on one side of the piston 16 by means of a passageway 19, while the conduit 14, on the other side of the outlet valve 13, is in communication with the chamber 18a on the other side of the piston 16 by means of a passageway 19a. The variable orifice outlet valve 13 may be adjusted from the outside of the valve housing 9 by a lever 20. In a housing 9a which is directly adjacent the housing 9, are located spring 21, a plunger 22 and a spring 23, all of which back the piston 16. The spring 23 is considerably stronger than the spring 21. The plunger 22 operates in a chamber 24 which is connected by a passage 25 to a chamber 26. In the chamber 26 is a body of mercury or other fluid substance which expands when heated.

In the operation: As explained in my copending application previously referred to, the balanced valve 12 is provided with the piston 16 which is exposed on each side to the respective pressures on each side of the orifice of the outlet or flow control valve 13. This balanced valve serves to maintain a constant differential pressure across said orifice, said differential being determined by the spring 21 acting on said piston 16. If the compression of the spring is lessened the differential will be decreased.

Referring now to the function of the present invention, it will be seen that the plunger 22 has an area exposed to the mercury in chamber 26. The temperature of the mercury is controlled by conduction of heat through the body of the valve, and an increase in temperature will cause expansion of the mercury which will in turn move the plunger 22 to the right thereby compressing spring 23 and lessening the compression of the spring 21. The result will be that the pressure differential across the valve 13 will be decreased. This reduction in pressure differential will compensate for the fact that oil at increased temperature would normally flow more rapidly through the orifice in the outlet valve 13.

In Fig. 2 it will be noted that the temperature of the viscosity curve designated "oil", is approximately a logarithmic curve. The movement of the plunger 22 caused by the mercury expansion may be plotted as a straight line in comparison to the temperature. The mercury pressure correction line, therefore, will be a straight line approximately following the viscosity curve through the normal temperature range.

The modification shown in Fig. 3 has the same general valve structure as that shown in Fig. 1. In this modification, however, the valve piston 16 is backed by a single spring 27.

At the left end of the valve housing 9 is a housing 28 provided with a mercury chamber 29 into which projects a rod 30 which is directly connected to a plunger 31, the latter having a cam surface 32. A slidable plunger spring seat 33 has a bullet shaped nose 34 which contacts the cam surface 32. This spring seat 33 contains a spring 35 which bears on the end of the balanced inlet valve 12 to counteract the action of the spring 27. The compression of the spring 35 is directly controlled by the position of the plunger 31. The expansion of the mercury in the chamber 29 will act on the rod 30 which projects into said mercury and will tend to move the rod upwardly thereby changing the position of the plunger 31 and compressing the spring 35. It will be seen that the higher the temperature of the pressure liquid, the greater will be the expansion of the mercury and the movement of the plunger 31. The compression of the spring 35, therefore, will have a definite relationship to the temperature of the pressure liquid. The springs 27 and 35 are, of course, originally adjusted to maintain a predetermined pressure differential across the orifice of the valve 13. Any increase in the compression of spring 35 will further counteract spring 27 and decrease the resultant spring force on the orifice valve 12 thereby decreasing the aforesaid pressure differential. The device is therefore designed so that a decrease in oil viscosity will be accompanied by a suitable lowering of the pressure differential across valve 13 so that the total oil flow through said valve 13 will always be constant. This means that the exhaust flow from the cylinders 6 as shown in Figs. 1 and 3 may be maintained at a constant rate regardless of the viscosity changes in the pressure fluid.

By plotting the logarithmic viscosity curve of the oil against the face of the cam surface 32, it is possible to illustrate the correction for the changes in oil viscosity due to temperature. As shown in Fig. 4 the mercury pressure correction line of the last described embodiment is practically identical with the viscosity temperature curve of the oil.

What I claim is:

1. In a hydraulic constant flow control valve, an adjustable throttle orifice, a pressure balanced orifice valve to maintain a predetermined pressure differential across said throttle orifice, a mercury filled expansion chamber, means responsive to the expansion of the mercury in said chamber, and spring means operatively connecting said balanced orifice valve with said first named means to regulate said pressure differential to maintain a predetermined relationship between the pressure differential and the temperature of the flow control valve.

2. In a hydraulic constant flow control valve, a housing, a throttle orifice formed in said housing, a pressure balanced orifice valve, spring means acting on said orifice valve to maintain a predetermined pressure differential across said throttle orifice, and temperature responsive means comprising a liquid expansion chamber formed in said housing, and a piston exposed on one side to said liquid and adapted to control the force of said spring means to alter the pressure differential across said throttle orifice thereby to allow a constant liquid flow through said valve by maintaining a predetermined relationship between the pressure differential and the temperature of the liquid flowing through the control valve.

3. In a hydraulic liquid control valve, an adjustable throttle orifice, a pressure balanced orifice valve, spring means exerting force on said orifice valve to maintain a predetermined pressure differential across said throttle orifice, a mercury filled expansion chamber, piston means responsive to the expansion of the mercury in said chamber and operatively connected to the spring means to alter the force thereof, said spring means and piston being adapted to control the pressure differential across said throttle orifice to maintain a predetermined relationship between the pressure differential and the temperature of the liquid flowing through the control valve and thereby acting to maintain a constant liquid flow through said control valve.

4. In a hydraulic constant flow control valve of the type having an adjustable throttle orifice, and a pressure balanced orifice valve adapted to maintain a predetermined pressure differential across said throttle orifice, a mercury filled expansion chamber, means responsive to the expansion of the mercury in said chamber, and spring means operatively connecting said balanced orifice valve with said first named means to regulate said pressure differential to maintain a predetermined relationship between the pressure differential and the temperature of liquid flowing through the control valve.

5. In a hydraulic constant flow control valve, a housing, a throttle orifice formed in said housing, a pressure balanced orifice valve located in said housing to maintain a predetermined pressure differential across said throttle orifice, a liquid filled expansion chamber formed in said housing, means responsive to the expansion of the liquid in said chamber, and means mechanically and resiliently connecting said balanced orifice valve with said first named means to regulate said pressure differential to maintain a predetermined relationship between the pressure differential and the temperature of liquid flowing through the flow control valve.

6. In a hydraulic constant flow control valve, an adjustable throttle orifice, a pressure balanced orifice valve, spring means acting on said orifice valve to maintain a predetermined pressure differential across said throttle orifice, a mercury filled expansion chamber, a slidable plunger member exposed on one side to, and responsive to the expansion of, the mercury in said chamber, and spring means operatively connecting said balanced orifice valve with said plunger member to alter the effect of said first named spring means and thereby to regulate said pressure differential to maintain a predetermined relationship between the pressure differential and the temperature of liquid flowing through the control valve.

7. In a hydraulic constant flow control valve, a valve housing, an outlet orifice, a pressure balanced orifice valve, spring means acting on said valve and adapted to maintain a predetermined pressure differential across said throttle orifice, a fluid expansion chamber in said valve housing containing a fluid which expands with increased temperature, a piston means exposed on one side to said expansion chamber, and spring means mechanically connecting said piston means with said orifice valve to alter the effect of said first named spring means whereby to regulate said differential pressure, said orifice valve, expansion chamber, piston means, said second named spring means cooperating to maintain a definite predetermined relationship between said pressure differential and the temperature of liquid flowing through said valve housing.

8. In a hydraulic system having a viscous pressure fluid subject to viscosity changes with variations in temperature, a constant flow control valve comprising a valve housing, an outlet orifice, a pressure balanced orifice valve adapted to maintain a normal predetermined pressure differential across said throttle orifice, a fluid expansion chamber in said valve housing containing a fluid which expands and contracts with temperature variations, a piston means exposed on one side to the fluid in said expansion chamber, plunger means responsive to the movement of said piston means, and a spring operatively connecting said plunger to said orifice valve to regulate said differential pressure.

9. In a hydraulic system having a viscous pressure fluid subject to viscosity changes with variations in temperature, a constant flow control valve comprising a valve housing, an outlet orifice, a pressure balanced orifice valve adapted to maintain a normal predetermined pressure differential across said throttle orifice, a fluid expansion chamber in said valve housing containing a fluid which expands and contracts with temperature variations, a piston means exposed on one side to the fluid in said expansion chamber, cam means responsive to movement of said piston having a cam surface identical to the curve obtained by plotting the logarithmic viscosity curve of said pressure fluid, said cam means being operatively connected to said orifice valve to regulate said differential pressure in relation to temperature variations such that differential pressure will decrease at a predetermined rate relative to temperature increase and viscosity decrease of the pressure fluid to maintain a constant flow of pressure fluid through said outlet orifice.

HARRY F. VICKERS.